Patented Nov. 26, 1940

2,222,872

UNITED STATES PATENT OFFICE 2,222,872

WATER INSOLUBLE OR WATER-RESISTANT STARCH PRODUCT

Gerald J. Leuck, Evanston, Ill., assignor, by mesne assignments, to Corn Products Refining Company, New York, N. Y., a corporation of New Jersey No Drawing. Application December 10, 1937, Serial No. 179,121

13 Claims. (Cl. 134—23.4)

This invention relates to starch compounds; and its object is to provide a starch product consisting essentially of starch and formaldehyde which is treated so that it will be highly water resistant, that is to say substantially unaffected by prolonged contact with water, and, more particularly, to provide a starch product in paste form, which, when set or solidified by suitable curing procedure, will be adhesive and cohesive as well as water resistant or water insoluble, so that it may be used as a bonding substance, a size, an impregnating agent, a coating material, or for other like purposes where resistance to moisture, of which ordinary starch products are incapable, is a requisite. For example, the starch or starch substance of this invention may be used as a water resistant adhesive for plywood and is incomparably better for such purposes than any adhesive heretofore produced with starch as a base.

By the word "starch" when used without qualification is meant not only raw starch or starch containing material, but also starch derivatives, or hydrolysis products, of the series from gelatinized starch to the highly soluble dextrines; and the starches, so defined, which may be treated in accordance with the invention comprise all the common starches such as corn, potato, wheat, rice and tapioca starches. For example, the starch substance used may be raw or low fluidity starch, thin boiling or high fluidity starch, dextrine, British gum or gelatinized starch. The use of gelatinized starch has been found particularly desirable, for example a gelatinized, or cold water pasting starch, made by passing raw corn starch in a moist state between rolls heated to a superficial temperature of about 370° F., more or less, according to the method described in United States patent to Fred Giesecke, No. 1,979,257, granted November 6, 1934.

The method of treatment provided by the present invention comprises mixing the starch, to form a paste, with formaldehyde or formaldehyde producing compound at low pH after pre-treatment of the starch either by extreme dehydration, or with an alkali. The procedure involving pre-treatment with an alkali is not claimed specifically herein as it forms the subject matter of a copending application filed December 10, 1937, Serial No. 179,122.

In this application the form of pre-treatment covered is that referred to herein as "dehydration." This term, however, is to be distinguished from ordinary water removing procedures which are sometimes, perhaps, more commonly included under the term "dehydration" but which remove neither adsorbed water nor, to any considerable extent, water combined with starch as starch hydrates. It is believed that the explanation of the results of the various treatments found effective for this step herein called "dehydration" is that either through long contact with dry air at elevated temperature or through contact with other gases, such as carbon-dioxide or alcoholic or other organic vapor, the adsorbed films of water as well as water combined with the starch are displaced and perhaps substituted by air or carbon-dioxide or organic vapor, and the term "dehydration" is used herein in that sense; whereas, ordinary drying procedures remove substantially only the absorbed water and are consequently useless for the purpose of this invention.

This substantially complete removal of all forms of water appears to be essential to successful production of the waterproof starch compound of this invention, since the product loses its special valuable quality of potential water resistance if it is allowed to have or to regain even an extremely small amount of moisture, as measured by laboratory tests, prior to the formaldehyde treatment. By "potential water resistance" I mean water resistance when developed and utilized in the compounds as hereinafter described.

The formaldehyde may be a readily soluble or volatile form of formaldehyde; or, preferably, a solution of formaldehyde known as formalin. It is preferred that the water used should not be in excess of the amount of water contained in the usual commercial formalin, i. e. 60%.

The pH, which should be 2 or lower, which has been found to be essential if maximum water resistance together with high degrees of cohesiveness and adhesiveness are desired, may be obtained by use of an acid or acid reacting substance. For this purpose any acid, for example a mineral acid like hydrochloric or sulfuric acid or an organic acid like lactic acid, or acid reacting substance, such as an acid salt or acid reacting salt like sodium bisulfate, aluminum sulfate, or acetyl chloride, may be employed if it gives a low enough pH to produce the desired substantial degree of insolubility or water resistance. It is preferable that the pH be below 2, or sufficiently low so that the colorimetric indicator of pH, meta cresol purple, will be turned pink, rather than yellow, by the pH attained. This low pH is necessary, however, only at the point of the procedure at which the development of water-insolubility or water-resistance is desired, and is not necessary either previous to or subsequent to this point of the procedure.

A means of operation which has been found convenient for controlling the pH in this manner is as follows: (1) A paste is prepared which comprises an aqueous medium, starch, formaldehyde, and sufficient acid to lower the pH until it has approached but is still above the pH desirable for producing the water-insoluble or water-resistant state of cure. (2) At the time this cure is wanted, the aqueous medium is evaporated, either at ordinary or at elevated temperature, to such an extent that with the increasing acid concentration the pH drops to the point desired for curing. The constitutions and proportions of the ingredients which have been employed in preparing the original paste and the conditions to which the paste has been subsequently subjected should have been so selected that, at the time of curing, conditions other than pH are also favorable to the kind of cure desired. For instance, if a high degree of cohesiveness or adhesiveness is desired in conjunction with insolubility, the proportion of aqueous medium present at the time cure takes place should be very small. (3) After the cure has been obtained, if desired the pH may be increased again by such means as neutralizing more or less of the acid with alkali or by washing it out with water.

The lowest pH which is operative in this step of my invention depends upon the particular conditions employed in applying my invention; and this pH should be high enough so that predominant action will be neither saccharification nor charring of the starch. The lower limit of pH to be employed will also be restricted by the fact that usually no larger amount of residual acid than that which has been necessary to develop the desired water-resistance, will be wanted in the final applied product.

If acids substantially weaker than hydrochloric and sulfuric acids are used, larger amounts of them must be employed in order to attain the same desired low pH. This is not ordinarily advisable. However, in certain cases a larger amount of a substantially weaker acid may be advantageous. For example, in treatment with the starch product of a cloth fabric which, in contact with a strong acid, is very sensitive to deterioration, employment of a relatively large amount of oxalic acid instead of a trace of hydrochloric acid will more readily allow the desired control of the pH while preventing injury to the fabric.

An acid reacting salt capable of yielding a pH low enough to induce the development of water-resistance may also be advantageous in certain cases even if a relatively large amount of it must be used in order to attain this pH. For example, aluminum sulfate is generally used in relatively large proportions in ordinary paper manufacture. This acid reacting salt may therefore likewise serve advantageously as the ingredient for producing the low pH necessary for developing water-resistance of the alkali-treated or dehydrated starch, when starch treated in accordance with this invention is employed as a size for the purpose of imparting water-resistant and other desired qualities to the paper.

The development of water-resistance or water-insolubility produced during the final step of the process may be brought about at ordinary room temperature or even at lower temperatures, but the use of elevated temperatures (in cases in which it is practicable to employ elevated temperatures) is usually more advantageous, for the following reasons: In general, it has been found that the higher the temperature employed, the greater the speed of development of water-resistance, and the lower the concentration of the acid or acid reacting substance needed to attain the desired degree of water-resistance. Employment of a relatively high concentration of acid substance is frequently undesirable. High speed of development of water-resistance or water-insolubility is frequently advantageous. Moreover, if conditions are such as to allow only slow development of water-resistance or water-insolubility, the necessary formaldehyde and acid substance may tend to dissipate away from the starch preparation,—for instance through volatilization when used in thin layers or through absorption when used in conjunction with a porous material—to such an extent that either the formaldehyde or hydrogen ion will not remain in sufficient concentration to complete the development of a satisfactory degree of water-resistance or water-insolubility.

The water-resistant product of starch and formaldehyde obtained during the final step of the invention may be pulverulent, granular or in the form of a filament, a film, a sheet, or may be applied to or incorporated with other bodies or materials. In appearance it may vary from opacity to transparency, and in color from white to dark.

In using the process specifically described herein, to-wit, the process involving dehydration of the starch as defined herein before it is mixed with the formaldehyde and acid, for the bonding of plywood, the dehydrated starch should be kept from any substantial contact with atmospheric or other moisture until the formaldehyde has been incorporated therewith; the formaldehyde and acid mixture should not contain a substantially greater amount of water than is contained in commercial formalin; the adhesive paste should be applied to the wood with the latter in a substantially dry condition, and the plywood panel should be assembled and cured by heat, before any substantial quantity of atmospheric moisture can be absorbed. When these conditions (which are not necessary if the starch is pre-treated with alkali in accordance with the copending application above referred to) are rigidly complied with, a bond between the wood plies is obtainable, the strength of which is greater than the strength of the wood itself and which will be unaffected by long soaking in water. The bond in fact may be even better than when the alkali pre-treatment is used.

The following are specific examples of the application of the invention to practice. It is to be understood, however, that these examples are to be taken as typical and informative merely and not as limiting the invention to the particulars given; the intention being to cover all equivalent operations and all modifications within the scope of the appended claims.

*Example 1*

Gelatinized or cold water pasting starch, made for example, by passing moist raw starch between heated rolls as above described, is spread out on trays as ¼ inch thick layers. The trays are placed in a dehydrating cabinet. The temperature of the interior of the cabinet is elevated to 275° F. in the course of 3 hours, and this temperature is then maintained for 20 hours. During the entire treatment in the cabinet the layers of starch are subjected to a slow current of nearly dry air, air, for example, which shows a relative humidity of 10% to 20% at 70° F. The dehydration procedures described herein will remove from the starch more moisture than it is necessary to remove in order that the starch, when tested by the tests ordinarily used for moisture determination in starch, will show total absence of moisture. The dehydrated product is enclosed for cooling and if desired for storage and while still hot, in containers which are sufficiently tight to substantially prevent contact of the product with atmospheric moisture. If the product is not to be soon used, the containers should be kept in an atmosphere which is as dry as practicable, and preferably at a temperature below 75° F., in order to insure against deterioration of the product through contact with atmospheric moisture. It is preferable, however, that the product be used soon after cooling which should be effected in the tight containers as above described.

Equal weights of starch, treated as above, and of formalin are mixed together by means of such manipulation that the starch product is subjected to no substantial contact with atmospheric moisture until after it has been wetted by the formalin. The pH is lowered to a suitable curing condition by mixing one part by weight of 1.8% aqueous hydrochloric acid with 10 parts of the starch used. The hydrochloric acid may be added at the same time as the formalin, although it is preferable not to add it until after the starch product and the formalin have been well mixed.

The resulting adhesive paste yields excellent water-resistant plywood bonds when subjected to the usual heat and pressure cure treatment. Thus, when this paste is used as the adhesive in plywood preparation by means of methods which are conventional except for employment of the above described conditions of low moisture content and low pH, that is, pH at 2 or below when water insolubility is developed, a 10-minute heat cure of a 1/16 inch veneer, 3 ply panel at 120° C. (248° F.) under a pressure of 200 pounds per square inch, yields plywood bonds which remain stronger than the wood even though the plywood is soaked in water for weeks.

*Example 2*

Gelatinized starch of the kind described in Example 1 is subjected in ¼ inch thick layers to a 29 to 30 inch vacuum for 24 hours. During the first 4 hours of this time the temperature is gradually elevated to approximately 140° C. (284° F.) and this temperature is maintained for the remaining 20 hours. The resulting starch product is then transferred into tight containers, by means of manipulations which prevent substantial contact with atmospheric moisture, and is subsequently treated with formaldehyde under conditions of low pH as in Example 1. The product is particularly suitable for use in cases where a nearly colorless, water-resistant adhesive is desired.

*Example 3*

100 parts of gelatinized starch of the kind described in Example 1 is dried to substantially constant weight at 100° C. (212° F.) in an ordinary tray oven dryer. The dried product is then placed in a horizontal cylinder which is closed except for a gas aperture at each end. The temperature of the material in the cylinder is gradually elevated so that it reaches a maximum of approximately 140° C. (284° F.) in the course of 3 hours. This temperature is maintained for 20 additional hours, and the cylinder and contents are then cooled. During the entire time the starch is in the cylinder carbon dioxide gas at the rate of 1 part by weight per hour is continually passed through the cylinder and the cylinder is likewise continuously revolved during this time as a means of mixing the ingredients.

As soon as ordinary room temperature has been reached again, the product of this dehydration treatment is put into air-tight containers to prevent any substantial contact with atmospheric moisture and so kept until treated with formaldehyde under conditions of low pH as for instance in Example 1.

*Example 4*

The procedure is the same as in Example 3 except that the carbon dioxide gas used is bubbled through substantially dry methanol before it is passed through the horizontal cylinder. The product of this example is somewhat more resistant to deterioration and loss of its potential water-resistant characteristics, under warm and humid atmospheric conditions, than are the products of Examples 1, 2 and 3.

*Example 5*

The dehydration procedure is the same as in Example 3 but an ordinary dextrine, which is almost completely water-soluble, is used instead of the cold water pasting starch. The same precautions as in Example 3 are employed to prevent substantial contact with atmospheric moisture before admixture of the dehydrated starch derivative with formalin.

Upon admixture of the dehydrated starch substance, in this case dextrine, with an equal weight of formalin and reduction of the pH until the mixture is pink to the indicator meta cresol purple, a paste is formed which may be cured to insolubility and which, while in the paste form, is more fluid than pastes obtained in Examples 1 to 4.

The paste made by mixing together the dehydrated starch, formalin and acid should have a water content preferably not substantially in excess of twice the weight of formaldehyde present.

I claim:

1. Process of treating starch to make it water-resistant which comprises: dehydrating the starch to remove all absorbed water together with some adsorbed water and water of starch hydrate and while it is in this condition mixing it with formaldehyde and an acid substance.

2. Process of treating starch to make it water-resistant which comprises: passing the starch in a moist state between heated rolls to gelatinize it; dehydrating it to remove all absorbed water together with some adsorbed water and water of starch hydrate; and while it is in this condition mixing it with formaldehyde and an acid substance.

3. Process of treating starch to make it water-resistant which comprises: dehydrating the starch to remove all absorbed water together with some adsorbed water and water of starch hydrate and while it is in this condition mixing it with formaldehyde, an acid substance and water not substantially in excess of twice the weight of the formaldehyde.

4. Method of treating starch to make it water-resistant which comprises: dehydrating the starch to remove all absorbed water together with some adsorbed water and water of starch hydrate and, while it is in this condition, mixing with it formaldehyde and an acid substance to give the mixture a pH not substantially higher than 2 when water insolubility is developed.

5. Method of treating starch to make it water-resistant which comprises: dehydrating the starch to remove all absorbed water together with some adsorbed water and water of starch hydrate and, while it is in this condition, mixing with it formaldehyde, water not substantially in excess of twice the weight of the formaldehyde and an acid substance in an amount to give the mixture a pH not substantially higher than 2 when water insolubility is developed.

6. Method of treating starch to make it water-resistant which comprises: dehydrating the starch to remove all absorbed water together with some adsorbed water and water of starch hydrate and, while it is in this condition, mixing with it formalin, having a water content not substantially greater than approximately 60%, and an acid substance.

7. Method of treating starch to make it water-resistant which comprises: dehydrating the starch to remove all absorbed water together with some adsorbed water and water of starch hydrate and, while it is in this condition, mixing with it formaline having a water content not substantially greater than approximately 60%, and an acid substance in such quantity that the pH of the mixture is not substantially higher than 2 when water insolubility is developed.

8. Process of making an adhesive paste that may be cured by heat to be cohesive, adhesive and substantially water insoluble which comprises: dehydrating starch to remove all absorbed water together with some adsorbed water and water of starch hydrate and mixing with the same a substantially equal weight of formalin and an acid substance to give the mixture a pH not substantially higher than 2 when water insolubility is developed.

9. Process of bonding ply board which comprises: dehydrating starch to remove all absorbed water together with some adsorbed water and water of starch hydrate; mixing it in this state with formaldehyde and water not substantially in excess of twice the weight of the formaldehyde and an acid substance to give the mixture a pH not substantially higher than 2 when water insolubility is developed; spreading the paste thus formed on the plies to be bonded and subjecting the material to heat.

10. Process of bonding materials which comprises: dehydrating starch to remove all absorbed water together with some adsorbed water and water of starch hydrate; mixing it in this state with formaldehyde and water not substantially in excess of twice the weight of the formaldehyde, and an acid substance to give the mixture a pH not substantially higher than 2 when water insolubility is developed, spreading the paste thus formed on the materials to be bonded, and subjecting such materials to heat.

11. A product of starch, substantially dehydrated in the sense that all absorbed water together with some adsorbed water and water of starch hydrate is removed, formaldehyde and an acid substance which product, when solidified, is cohesive, adhesive and water insoluble.

12. A product of gelatinized starch, substantially dehydrated in the sense that all absorbed water together with some adsorbed water and water of starch hydrate is removed, formaldehyde and an acid substance which product, when solidified, is cohesive, adhesive and water insoluble.

13. A product of dextrine, substantially dehydrated in the sense that all absorbed water together with some adsorbed water and water of starch hydrate is removed, formaldehyde and an acid substance which product, when solidified, is cohesive, adhesive and water insoluble.

GERALD J. LEUCK.